(12) United States Patent
Sesek et al.

(10) Patent No.: US 7,904,391 B2
(45) Date of Patent: Mar. 8, 2011

(54) METHODS OF RETURNING MERCHANDISE PURCHASED BY A CUSTOMER FROM A VENDOR, COMPUTER IMPLEMENTED METHODS PERFORMED BY A VENDOR, AND RETURN OF MERCHANDISE PROCESSING APPARATUSES

(75) Inventors: Robert Sesek, Meridian, ID (US); Susan M F Davis, Nampa, ID (US); Steve O Rasmussen, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1971 days.

(21) Appl. No.: 10/280,574

(22) Filed: Oct. 24, 2002

(65) Prior Publication Data

US 2004/0083179 A1 Apr. 29, 2004

(51) Int. Cl.
*G06F 17/00* (2006.01)
(52) U.S. Cl. .............. 705/53; 705/51; 235/385; 235/381
(58) Field of Classification Search .............. 705/1, 400, 705/53, 51; 235/385
See application file for complete search history.

(56) References Cited

U.S. PATENT DOCUMENTS

| | | | | |
|---|---|---|---|---|
| 4,813,912 A | * | 3/1989 | Chickneas et al. | ............ 705/408 |
| 5,960,411 A | * | 9/1999 | Hartman et al. | ................. 705/26 |
| 5,970,475 A | * | 10/1999 | Barnes et al. | .................... 705/27 |
| 6,208,980 B1 | * | 3/2001 | Kara | .............................. 705/408 |
| 6,233,565 B1 | * | 5/2001 | Lewis et al. | ....................... 705/35 |
| 6,536,659 B1 | * | 3/2003 | Hauser et al. | .................. 235/375 |
| 6,547,136 B1 | * | 4/2003 | Sansone | ......................... 235/385 |
| 6,801,999 B1 | * | 10/2004 | Venkatesan et al. | ........... 713/167 |

* cited by examiner

*Primary Examiner* — Calvin L. Hewitt, II
*Assistant Examiner* — John M Winter

(57) ABSTRACT

A currency distribution system and method. In accordance with the invention, a first transaction is facilitated by which currency is transferred electronically between a first entity and a second entity, and whereby a first balance of currency is maintained by said second entity. A second transaction is facilitated by which at least a portion of the first balance of currency is transferred electronically between the second entity and a third entity. In particular, the second transaction is facilitated by a processor that includes code for ascertaining data with respect to the third entity, the data pertaining to goods or services unrelated to the currency, and providing a qualification in response thereto. A second processor included for enabling the second transaction in response to the qualification. A database is employed and a query is made to determine the qualification for the second transaction. In an illustrative embodiment, the first entity is a postal service, the second entity is a vendor, and the third entity is a customer of the vendor. In the illustrative application, the currency is postage and the processor communicates the ability to print and utilize postage to the customer. The postage is used to return goods from the customer to the vendor.

16 Claims, 4 Drawing Sheets

METHODS OF RETURNING MERCHANDISE PURCHASED BY A CUSTOMER FROM A VENDOR, COMPUTER IMPLEMENTED METHODS PERFORMED BY A VENDOR, AND RETURN OF MERCHANDISE PROCESSING APPARATUSES

BACKGROUND OF THE INVENTION

1. Field of the Invention

The present invention relates to communication systems. More specifically, the present invention relates to systems and methods for communicating data via a wide area network such as the Internet, including currency, postage, and indicia of postage or postage-like value indicia.

2. Description of the Related Art

Individuals, organizations, and business entities (collectively "individuals") utilize postal and mail services on a regular basis. Historically, postage stamps have been applied to letters and packages as a representation that the required fee for delivering a letter or package had been paid. An improvement to the utilization of physical postage stamps is the application of indicia of postage with a postage meter. A postage meter incorporates a secure postage account device that is locally credited with a value of money. This has historically been accomplished by removing a portion of the postage meter and taking it to a post office, or taking the entire postage meter to a post office, where the postal service increments the postal account balance in the postage meter. A seal is applied to the device to prevent and/or indicate tampering. The account increase is accomplished by crediting the account value in the postage meter, through utilization of a secure procedure, in exchange for payment of an equal value of money to the postal service. The account value in the postage meter has real value equivalent to a quantity of postage stamps. While neither is legal tender under law, both represent monetary value, and can therefore be regarded as currency.

Having a postage meter with an account value, or having a quantity of postage stamps, enables an individual to apply postage to a letter or package without the need of physically visiting a post office. A letter or package can be sent by placing it in a mailbox or drop box at the individual's residence, place of business, or a convenient neighborhood designated drop box. The amount of postage required for a given letter or package is a function of the weight, size, destination, and class of service. This information can be obtained by combining a number of techniques. Postal carriers and delivery services publish rate tables that establish the cost for delivering letters and packages based on destination, size, weight, class of service and other factors. The individual need only determine the size and weight of an article, and select the class of service. A rate table can be employed to determine the amount of postage that must be affixed to the letter or package for the selected class of service.

The use of postage meters and stamps has been driven largely by the need to protect against fraud and theft of services from postal and other delivery type services. If payment for shipping and delivery is made at the time a letter or package is deposited with a delivery service, then no such stamp or metering system is required. Although, the service provider may place an indicia of payment on the item so as to notify others who subsequently handle the item that payment has previously been received and the full amount paid. Essentially, whenever a postal service or delivery service conveys postage, in whatever portable form, controls need to be in place to prevent fraud and theft. Such controls are burdensome, and costly to implement.

There is a basic tension that exists between the relatively lower burden and cost to a postal or delivery service in requiring customers to bring letters and package to a facility for payment upon deposit, and the convenience customers desire in depositing items in their own mailboxes, or at local designated drop boxes. Postage stamps and postage meters are techniques employed to mitigate this tension. With the advent of digital communications over public and private networks, and the Internet in particular, there have been other attempts to mitigate this tension.

Recently, the United States Postal Service ("USPS") approved the use of electronic stamps. A company named E-Stamp was the first to successfully complete the U.S. Postal Service's arduous screening process. This was the first time a vendor was allowed to download postage over the Internet so that their customers, or users, could print it directly onto envelopes or labels using some combination of appliances such as software, a small piece of hardware, and a standard printer. The electronic stamps are officially called Information Based Indicia (IBI), by the USPS. The use of electronic stamps is the first alternative to conventional stamps since the approval of the postage meter in 1920. The approval process for suppliers of electronic stamps requires multiple levels of approval and testing because, essentially, electronic stamps represent the ability to print currency. In application, users pay for the electronic stamps online, then download them from a secure Internet site. The information to create the stamps is stored in the hardware, a security device. The device is connected to the personal computer's printer port. The electronic stamps are printed on the envelope or package label at the same time as the address.

The USPS identifies its electronic stamp product and process as PC Postage™. The USPS authorizes providers to use PC Postage™ for commercial applications. Information Based Indicia ("IBI") is a form of postage evidencing for digital postage generated from personal computers. Like other forms of postage such as stamps and meter impressions, IBI are printed on an envelope in the upper right hand corner, or on a label for an envelope or package, to indicate postage payment. The indicium includes a two-dimensional barcode that is machine readable, along with human readable information. The IBI conveys mail processing and security related data. It is called information-based because of the information-carrying opportunities of the two-dimensional barcode.

There are two steps to using PC Postage: purchasing postage and printing postage. To purchase postage, a customer establishes a connection with a PC Postage vendor's Internet site. The customer can then purchase an amount of postage up to a limit, typically $500.00. Payment is typically made either through electronic funds transfer or by credit card. This process requires a pre-certification procedure by the PC Postage vendor to establish an account for each user, so that credit worthiness and payment terms can be established and enforced. There are two different ways customers can store and access the prepaid postage value. In one way, the postage amount is downloaded and stored in a small security device that is attached to the customer's PC. With the other method, the postage amount is stored on the vendor's Internet site. When the customer prints postage, the dollar amount is deducted from the prepaid account. Additional postage can be purchased from the PC Postage vendor's Internet site. The PC Postage vendors establish their own product pricing and service fees for offering this service. Thus, they produce their own profit in providing this service.

The technologies used in PC Postage include database management systems, secure file transfer protocol, public key infrastructure, cryptographic certification, two-dimensional barcodes and scanning verification. The unique combination of these technologies with audit and control procedures provides secure products for postage purchase and printing over the Internet. With regard to the IBI, the security device creates a unique digital signature that is included in the barcode. Each indicium is unique to the mail piece. Scanning technology is used to read the barcode information and verify its unique relationship to the mail piece. Further, duplicates detected in the mail stream would indicate fraud. The digital signature is used to verify that the information in the barcode has not been tampered with or altered in any way. IBI may be used in a variety of postage applications, including variations with computer architecture integration. The first generation PC Postage products were targeted toward personal computers and small home or office customers. It is also applicable to enterprise systems for use with larger mailing systems that may use mainframes or client-server environments to assist in mail production.

Regarding the practical utilization of electronic stamps, the forgoing services are directed to end users who establish an account with such an electronic mail service provider through an account establishment procedure. However, there are many scenarios where it is desirable to provide the conveniences of electronic mail access to users who do not have an individual account. An example of such a situation is the case of a return mailer as utilized in a commercial transaction. When a customer purchases a product from a vendor via catalog or Internet shopping, there are a number of situations where the item may need to be returned. For example, the wrong item may have been received, the item may not be functioning properly, the item may be the wrong size, or the item may have a defect requiring a warranty service action. Perhaps the return is a result of the normal course of business, such as a rental operation where goods are normally returned. In all these cases, and many others, the customer will need to return the item to the vendor. Return mailing requires return postage.

Vendors have employed various procedures to account for return mailing costs. In some cases, the vendor provides prepaid postage with stamps or postage meter indicia, on a label or envelope for use in returns by a customer. This approach is grossly inefficient because the postage is wasted in the vast majority of cases where the customer does not actually make a return. In other situations, the vendor requires the customer to purchase stamps, and then the vendor refunds the cost by payment or credit to the customer's account. This is inefficient due to high transaction processing costs. In other situations, the vendor provides the prepaid postage upon request of the customer. This is not only inefficient, but time consuming as well. Hence, the prior art approaches suffer from inefficiencies and high costs.

In addition, a significant number of individuals could benefit from utilization of such services but for the fact that these individuals have usage levels too low to justify the burden and cost of establishing service from a conventional electronic mail service. There are also a significant number of individuals who are unable to access such services due to a poor credit rating or lack of a credit card, both of which are typically required by conventional electronic mail services.

Thus there is a need in the art for a method and apparatus for providing access to electronic stamps or prepaid mailing to end users, or customers, who do not otherwise have an established account with an electronic mail service provider, a postal carrier, or the USPS.

SUMMARY OF THE INVENTION

The need in the art is addressed by the apparatus and methods of the present invention. In an illustrative embodiment, a currency distribution system is taught. The teachings include a first arrangement for facilitating a first transaction by which currency is transferred electronically between a first entity and a second entity, and whereby a first balance of the currency is maintained by the second entity. Also, a second arrangement is included for facilitating a second transaction by which at least a portion of the first balance of the currency is transferred electronically between the second entity and a third entity. The second arrangement includes a third arrangement for ascertaining data with respect to the third entity, where the data pertains to goods or services unrelated to the currency, and provides a qualification in response thereto. Also, a fourth arrangement is included for enabling the second transaction in response to the qualification.

In a refinement to the foregoing teachings, the third entity is a customer with respect to goods or services supplied by the second entity unrelated to the currency. In the refinement, the third arrangement includes a database of the customers, and software for querying the database to ascertain whether an individual qualifies as one of the customers, authorization of the second transaction with respect to the customer, and correlation of the authorization with an electronic address assigned to the customer. In a further refinement, the third arrangement further includes a mechanism for electronically sending a portion of the balance of the currency to the electronic address of the customer. The third arrangement further includes an arrangement for electronically sending a software applet with the portion of the balance of the currency to the electronic address of the customer. The applet includes code for restricting printing of a document relating to the currency. In an illustrative application, the currency is postage and the first entity is the U.S. Postal Service or an electronic stamp provider.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
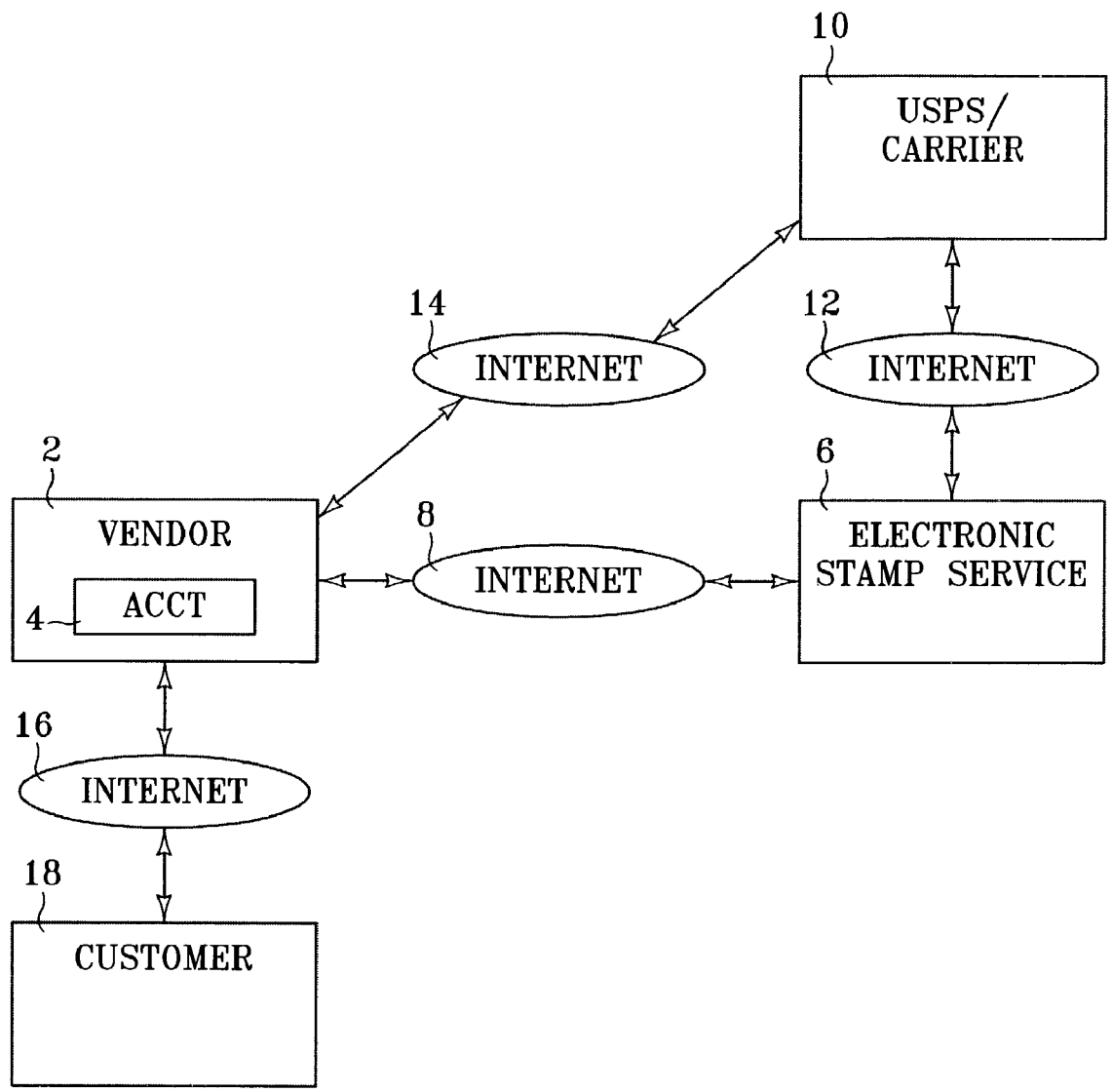
FIG. 1 is a functional block diagram of transaction information flow according to an illustrative embodiment of the present invention.

Reference is directed to FIG. 1, which is a block diagram of the transaction information flow according to an illustrative embodiment of the present invention. This is an application of the present invention where a first entity, or vendor 2, establishes an account 4 for postage value from a postal service provider. Of course, a preferred application of the illustrative embodiment is with respect to the official postal authority of a nation such as the United States Postal Service ("USPS"). However, the teachings herein are equally applicable to a private postal authority or service, or a private or national delivery service that employs postage or indicia of payment for services that possess postage-like value. Thus, the terms "postal service" or "postal service provider" as used herein refer to not only the official national postal service of a given country, but also all of the aforementioned kinds of delivery service providers.

The account 4 of postage value is a representation of a payment or an obligation to pay for the postage from another entity. In the case where that entity is an electronic stamp service 6, the vendor 2 pays money to the electronic stamp service 6 in an amount proportional to the postage value in the account 4.

In an alternative approach, the vendor 2 establishes the relationship directly with the postal service 10. This is largely a function of regulations, and convenience. For example, there are presently a number of business entities that have established electronic mail distribution arrangements with the USPS. Since the first introduction of electronic stamps, among the several suppliers that have been approved to provide this service including:

Internet Postage by Stamps.com, Inc., at www.stamps.com.
PCMail by Neopost Online at www.pcstamp.com
ClickStamp Online by Pitney Bowes, Inc. at www.pitneybowes.com/soho
EZMail by Neopost Online at www.simplypostage.com
PROmail by Neopost Online at www.simplypostage.com
Endicia Internet Postage by Envelope Manager Software at www.endicia.com
Simply PostageTM by Neopost, Inc. at www.simplypostage.com Each of these entities has completed the arduous procedures required to be a supplier of electronic postage for the USPS. Note that each of these entities is accessible through the Internet via the World Wide Web. This reality is reflected in FIG. 1 as the vendor 2 communicates with the electronic stamp provider 6 via an Internet connection 8. Each of these electronic stamp services 6 communicate, in turn, with the US postal service or other carrier 10 via an Internet connection 12. Of course, private networks can also be employed for this function. In the case where a vendor 2 chooses to employ an illustrative embodiment of the present invention by qualifying with the postal service 10, a direct Internet connection 14 is established between the vendor 2 and the USPS or other carrier 10 for the transacting of business. The net effect of this arrangement is to provide the vendor 2 with a bona fide account 4 of postage value that can be utilized in the same fashion as stamps or postage meter indicia. Once completed, the vendor is enabled to utilize electronic stamps.

FIG. 1 illustrates a novel advancement in the art according to the present invention where a vendor 2 is able to convey to a customer 18 access to the postage value in the vendor's account 4 via an Internet connection 16 (or any other reasonable communications connection). This enables the customer 18 to utilize electronic postage without the need to establish a direct relationship with either an electronic stamp service 6 or the postal service 10. The vendor 2 carriers the responsibility of managing the account 4 and access thereto. This is an important advancement in a number of scenarios, which will be obvious to those skilled in the art that have access to the teachings herein. Generally, the cases where: the customer 18 infrequently utilizes electronic stamps, or where the cost of postage is paid by the vendor 2 or some other entity, are appropriate applications of the present invention. This approach alleviates the burden on the customer 18 of having to establish an account, and greatly enhances the convenience of service a vendor 2 is able to deliver to a customer 18.

Figure 2:
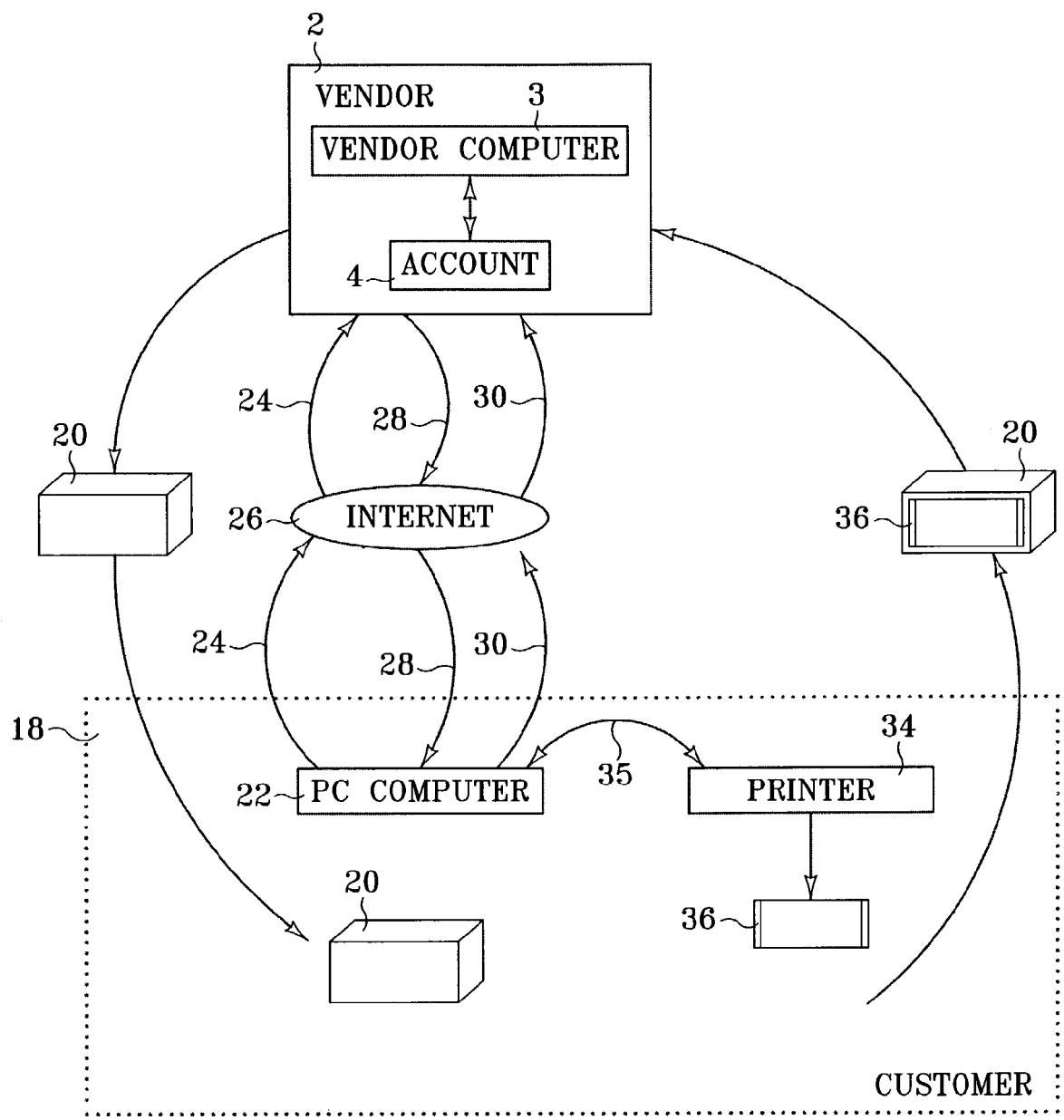
FIG. 2 is a block diagram of a transaction according to an illustrative embodiment of the present invention.

FIG. 2 is a block diagram of a transaction according to an illustrative embodiment of the present invention, which illustrates the commercial advantages thereof. It is becoming increasingly common to transact business over the Internet. This includes retail transactions. A typical scenario is one in which a customer 18 finds an item the customer desires to purchase from a vendor 2 on an Internet web site or by reading a catalog. A purchase transaction is made electronically such as over the Internet or by telephone contact, with payment usually via credit card. Then the vendor ships a package 20 to the customer 18. Frequently, this is the end of the commercial transaction. However, there are a number of situations in which the item and its package 20 need to be returned to the vendor 2. As noted above, this can be due to an error in the transaction, dissatisfaction by the customer, or many other problems with the transaction. With respect to the present invention, there may be an issue as to who bears the cost burden in returning the package 20 to vendor 2. For example, in the case of an error on the part of the vendor, a good customer service policy is for the vendor to cover the cost of return shipping. In the case of buyer's remorse, it may be appropriate to have the customer bear the cost burden. But regardless of which party bears the cost, there is typically a desire on the part of the vendor to provide convenience to the customer. Returning a package to a vendor is an inconvenience to the customer. One approach to mitigating this inconvenience is for the vendor to provide the postage and shipping label to the customer so the package can be deposited at the most convenient location. Sometimes the customer's home or office can be the pick-up point. Perhaps a local drop box is convenient. When the vendor provides the postage and label the convenience of the return process is enhanced.

FIG. 2 illustrates two different ways that the present invention provides enhanced convenience. As noted above, the vendor 2 ships a package (or letter size object) 20 to the customer 18. A problem arises and the customer 18 desires to return the item to the vendor 2. In the illustrative embodiment, the customer 18 accesses 24 the vendor 2 via the Internet 26 and executes an on-line procedure to initialize the return. The first action is for the vendor to approve the return, with what has been commonly referred to as a "return material authorization" ("RMA"). This represents the permission or agreement from the vendor for the return to occur. This approval could be made by a customer service representative from the vendor 2 when the request for RMA is made via phone or email. This approval could be automated in some alternative approaches by having the customer enter the product serial number or a shipping number. This alternative approach would work for scenarios with unconditional satisfaction guarantees, or in rental return operations. In the illustrative embodiment of the present invention, a one-time executable computer file, that includes the function of printing postage, is created by computer system 3. The action simultaneously debits the account 4 for the value of postage needed to effect the return. The executable file includes the return address and IBI indicia as well. The issues of weight, size, cost, and type of service are obviated for most scenarios because these characteristics for each item are already known to the vendor 2. The item is returned in the same package 20 as it was originally shipped in, with the destination merely the reverse of the original shipment. This unique executable file is transferred 28 to the customer's 18 personal computer 22 via the Internet 26, however, those skilled in the art will realize that any suitable electronic or media transfer could be employed. The personal computer 22 runs the single use, time-stamped executable file, which couples 35 the printable output with the customer's printer 34, which in turn prints the shipping label and postage 36. The customer 18 affixes label 36 to the package 20 and ships the package 20 back to the vendor 2, for subsequent handling. With this approach, the customer is alleviated from the burden of purchasing postage and producing a shipping label. The necessary RMA information has also been included in a preferred format, in a specified location according to the vendor 2 preference and specification, for security reasons and to prevent multiple and/or fraudulent use, an encryption key could be used also within the printed output 36. Note that the time-stamped executable file expires at a time certain. This limits the window of time during which a customer can make the desired return. The file is a one-time use file so that multiple printed copies cannot be created.

In another embodiment, which is also illustrated in FIG. 2, a different approach to debiting the vendor account 4 and securing the transaction is shown. In this embodiment, the package 20 is shipped from the vendor 2 to the customer 18. A return is needed, and the customer accesses 24 the vendor 2 via the Internet 26. The return is approved and an RMA (return merchandise authorization number) is granted. However, in this embodiment, the vendor 2 does not send a one-time time-stamped executable file, but rather enables a security key in the vendor's computer systems, and sends 28 the security key password to the customer's computer 22 via the Internet 26. At the time the customer prints the label and postage, which is accomplished with a computer application residing on the customer's computer 22, the computer 22 initiates another Internet session 30 with the vendor's computer 3. In this session, the security password is presented which enables the computer system 22 to print the label and postage on the printer 34. This could be accomplished in a number of ways. In one instantiation the user would be required to have a secure Internet connection with the vendor site while printing the postage. The advantage of this approach is that the account 4 is not debited until the printing operation is initiated. This approach reduces the likelihood that postage will be wasted, as the debiting action does not occur until the customer has decided that the package 20 needs to be returned, has received the RMA from the vendor 2, and has begun printing the postage. In the previous illustrative embodiment, the debit function occurred when the one-time executable file was created. In this latter approach, the debiting occurs when printing commences. In fact, in a refinement to this approach, the debiting can occur after the printer 34 has signaled the computer 22 that the print job is complete, which causes the computer to indicate the same status of completion to the vendor 2 over the internet 26 via connection 30. It is also possible for a message to be sent to the vendor 2 at the end of successful printing by the printer 34. This assumes a bidirectional active capability within the print device 34.

The label and electronic postage can be printed according to the specification of the mail service provider, generally. In the case of the USPS, the label includes the aforementioned indicia. According to the USPS, the IBI indicia is made up of human readable information as well as a two dimensional barcode that comprises the following information: ZIP Code; Date of Mailing; Destination Delivery Point; Postage; Software ID; Digital Signature; Ascending Register; Rate Category; Descending Register; Reserve Field; Algorithm ID; Indicia Version Number; Device ID, and Certificate Serial Number.

Figure 3:
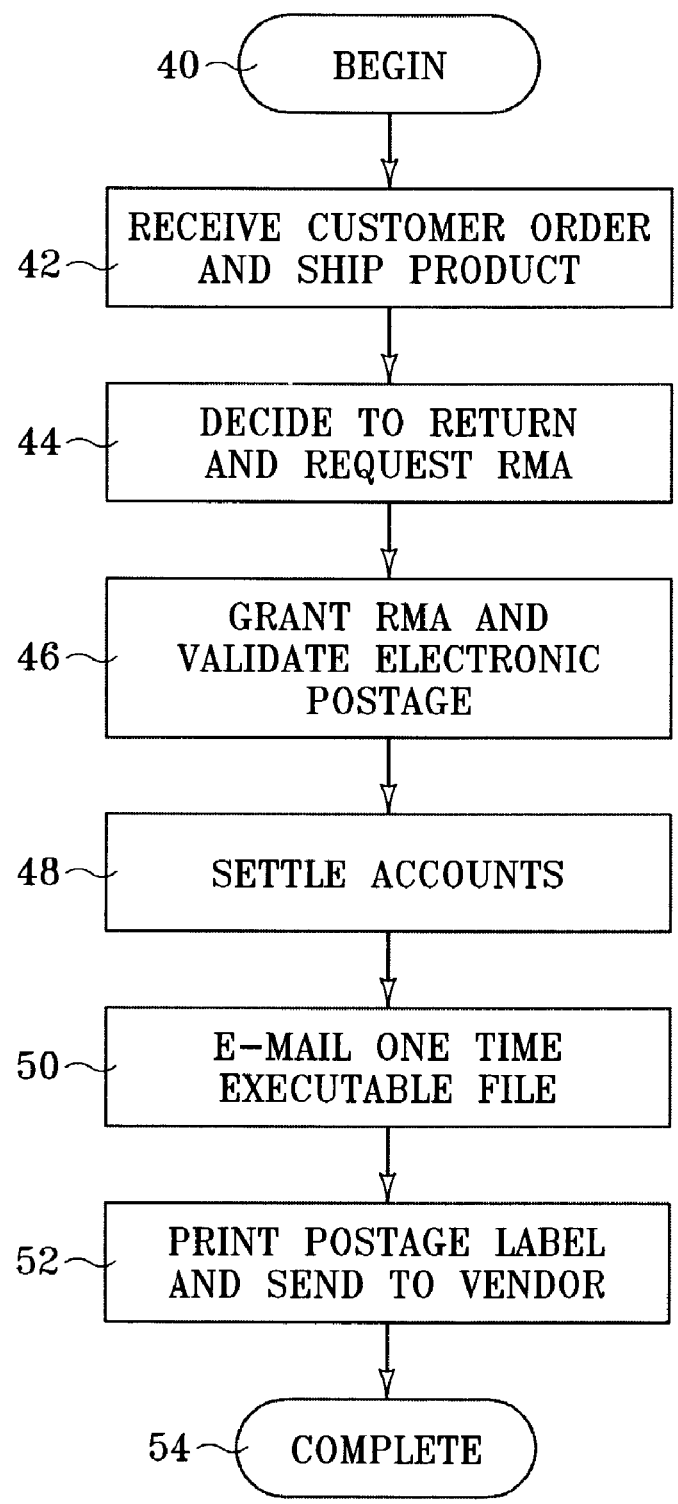
FIG. 3 is a flow diagram of an illustrative embodiment of the present invention.

Reference is directed to FIG. 3, which is a flow diagram of an illustrative embodiment of the present invention. The process begins at step 40 and proceeds to step 42 where the vendor receives a customer order and ships the ordered item to the customer. At step 44, the customer receives the item and decides to return the item, which is initialized by requesting an RMA from the vendor. Next, at step 46, the vendor approves the RMA, the one-time executable print file is produced, and the use of electronic postage is validated in the vendor's computer system. The issue of which entity bears the cost of return shipping is then addressed when the account of the vendor and the customer are settled at step 48. This issue is a matter of business strategy and market forces. Resolution of the issue generally addresses several questions. If the vendor covers the cost of the return, such as the case of a defective product, then the vendor covers the shipping. This means the vendor 'spends' an amount equal to the cost of the electronic postage and the customer spends nothing, other than physical effort. However, in the case where the return is due to buyer's remorse, for example, the vendor may require the customer to bear the return postage cost. Even in this case, the vendor can still provide the convenience of the electronic postage service. The account of the customer is debited for the. postage cost. Such accounts are typically settled via a credit card debit transaction against the customer's credit cart account. In fact, the vendor may desire to establish a profit center for this convenience and add a profit to the service. Thus, the cost borne by the customer may equal the actual electronic postage cost plus some amount of profit, for example. Indeed, the present invention is applicable to a vender that provides electronic mail access to individual users who do not have adequate credit or business size to access the conventional electronic mail services.

Continuing in FIG. 3, at step 50, the one-time, time-stamped executable file is sent to the customer, via e-mail in this embodiment. Once received by the customer, the postage and shipping label are printed at step 52. This includes the actions of affixing the label to the package and depositing it with the postal service. The process is then completed at step 54.

Figure 4:
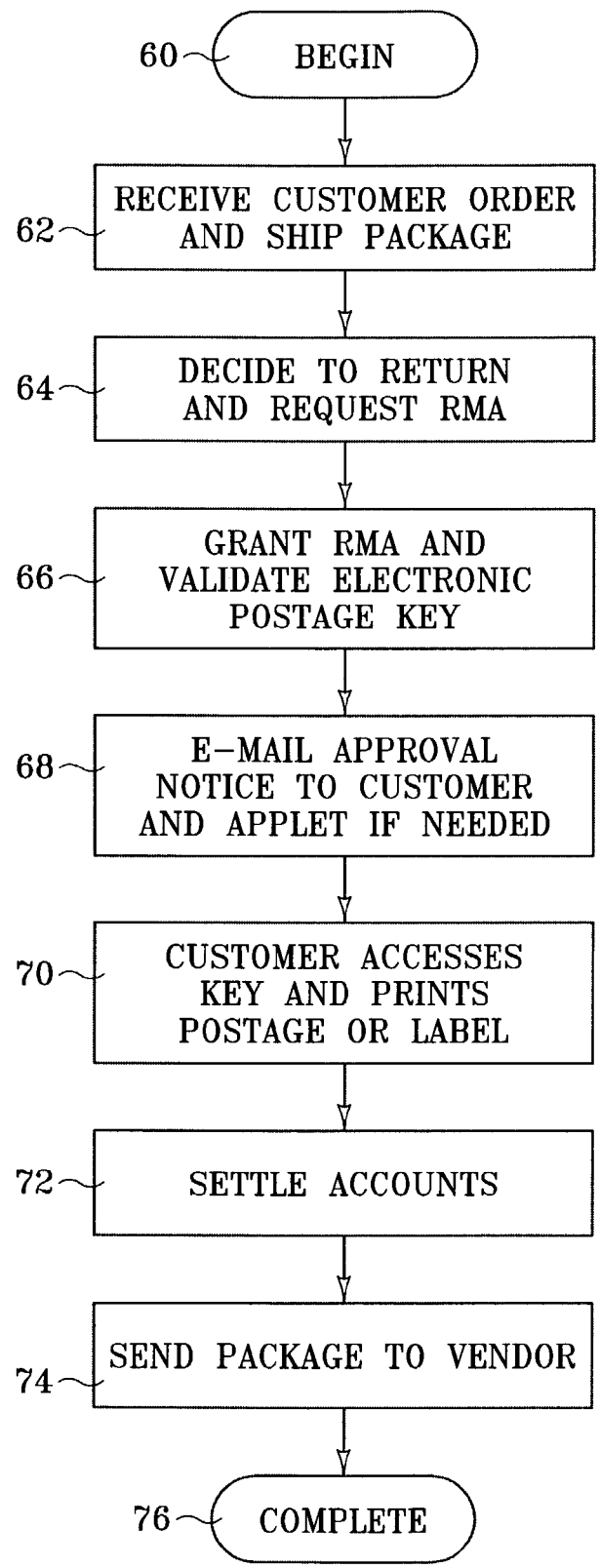
FIG. 4 is a flow diagram of an additional illustrative embodiment of the present invention.

FIG. 4 illustrates an alternative embodiment according to the present teachings. The process of this embodiment begins at step 60 and proceeds to step 62 where the customer order for an item is received and the item is shipped in a package to the customer. At step 64 the decision to return the item is made and the customer makes a request for an RMA from the vendor, typically via an Internet connection. At step 66, the vendor grants the RMA approval, and validates a security key in a computer system of the vendor. At step 68, the notice of approval is sent to the customer, together with the security key access code. If the customer's computer does not have a copy of the software application needed to utilize the security key and print the label and postage, the vendor computer delivers the applet at this time. The utilization of file transfer protocols, self-extracting applets, and security key systems are understood by those having ordinary skill in the art. At step 70, the customer proceeds to print the return shipping label and postage, and this action causes the customer's computer to access the vendor's computer over the Internet. In the transaction, the security key code is presented to the vendor computer and the match enables the customer computer to print the label and postage. Upon the security key access, or upon an indication that the print operation has commenced, the accounts are settled at step 72. The settling process is the same as that described with respect to FIG. 3, and will not be restated here. Having printed the label and postage, the customer sends the package to the vendor at step 74 and the process completes at step 76.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A method of returning merchandise purchased by a customer from a vendor, the method comprising:
   purchasing, by a customer, an item of merchandise from a vendor;
   a computer of the customer generating an electronic request seeking to return the item of merchandise after the purchasing;
   communicating the electronic request from the computer of the customer to the vendor;
   the vendor providing a return material authorization approving the electronic request to return the item of merchandise;
   after the providing, the vendor creating an executable computer file comprising an expiration date and an amount of postage for the return of the item of merchandise from the customer to the vendor, wherein the executable computer file expires after the expiration date;
   debiting a postage account of the vendor corresponding to the amount of the postage for the return of the item of merchandise from the customer to the vendor;
   communicating the executable computer file from the vendor to the computer of the customer;
   the computer of the customer executing the executable computer file to control printing of a shipping label including the postage for the return of the item of merchandise from the customer to the vendor, the executing causing the printing of the shipping label;
   affixing the shipping label to the item of merchandise; and
   after the affixing, shipping the item of merchandise from the customer to the vendor using the postage.

2. The method of claim 1 wherein the electronic request comprises an identifier of the item of merchandise, and wherein the providing the return material authorization comprises processing the identifier using a computer of the vendor and automatically providing the return material authorization without user intervention.

3. The method of claim 1 wherein the providing the return material authorization comprises providing responsive to approval of the electronic request by a customer service representative of the vendor.

4. The method of claim 1 wherein the creating comprises creating the executable computer file comprising a one-time executable file.

5. The method of claim 1 wherein the creating comprises creating the executable computer file comprising the expiration date which defines an amount of time for returning the item of merchandise to the vendor using the postage.

6. The method of claim 1 wherein the creating comprises creating the executable computer file comprising a return address and Information Based Indicia (IBI) of the postage, and wherein the shipping label includes the return address.

7. The method of claim 1 wherein the creating comprises creating the executable computer file including the return material authorization, and wherein the shipping label includes the return material authorization.

8. The method of claim 1 further comprising:
   the vendor storing a record comprising details of the item of merchandise; and
   using the record, the vendor calculating the amount of the postage for the return of the item of merchandise from the customer to the vendor.

9. The method of claim 1 wherein the executable computer file is not operational to cause printing of the shipping label after the expiration date.

10. The method of claim 1 wherein the executable computer file is not executable to cause printing of the shipping label after the expiration date.

11. The method of claim 1 wherein the creating comprises creating the executable computer file to be non-operational to cause the printing of the shipping label after the expiration date.

12. The method of claim 1 wherein the creating comprises creating the executable computer file to be not executable to cause the printing of the shipping label after the expiration date.

13. The method of claim 1 wherein the expiration date defines a date after which the file is not executable to print the shipping label.

14. The method of claim 1 wherein the executable computer file comprises instructions configured to prevent printing of more than one copy of the shipping label.

15. The method of claim 1 wherein the executable computer file comprises instructions configured to cause the computer of the customer to control the printing of the shipping label.

16. The method of claim 1 wherein the debiting occurs simultaneously with the creating the executable computer file.

* * * * *